United States Patent [19]
Kato et al.

[11] Patent Number: 6,157,786
[45] Date of Patent: Dec. 5, 2000

[54] MAGNETIC HEAD ELEMENT, MAGNETIC HEAD, PRESSURE PLATE USING MAGNETIC HEAD ELEMENT OR MAGNETIC HEAD, AND CAMERA USING PRESSURE PLATE

[75] Inventors: Minoru Kato; Masayuki Fujimura; Masato Odagiri, all of Chichibu, Japan

[73] Assignee: Canon Denshi Kabushiki Kaisha, Chichibu, Japan

[21] Appl. No.: 09/379,610

[22] Filed: Aug. 24, 1999

[30] Foreign Application Priority Data

Aug. 27, 1998 [JP] Japan ................................. 10-242145

[51] Int. Cl.$^7$ ............................. G03B 17/24; G11B 5/227
[52] U.S. Cl. ............................ 396/319; 396/440; 360/125
[58] Field of Search .................................... 396/319, 440; 360/125, 126, 127

[56] References Cited

U.S. PATENT DOCUMENTS

| | | | |
|---|---|---|---|
| 5,721,652 | 2/1998 | Jessop et al. | 396/319 X |
| 5,815,756 | 9/1998 | Akami et al. | 396/440 |
| 5,987,267 | 11/1999 | Miyamoto et al. | 396/319 |

*Primary Examiner*—W. B. Perkey
*Attorney, Agent, or Firm*—Fitzpatrick, Cella, Harper & Scinto

[57] ABSTRACT

A first magnetic core has a first portion that determines the track width, a second portion extending from the first portion substantially vertically, a third portion that extends from the second portion substantially vertically and is longer than the first track width, and a fourth portion extending from the third portion substantially vertically. The first to fourth portions form a substantially rectangular ring-like shape with its portion between the first and second portions being notched. A second magnetic core has a fifth portion longer than the first track width, a sixth portion extending from the fifth portion substantially vertically, and a seventh portion extending from the sixth portion substantially vertically. The fifth to seventh portions form substantially the shape of letter C. The first and second magnetic cores are joined to each other so that the first and fifth portions are joined through a gap spacer, the outer circumferential surfaces of the first and fifth portions form a surface to be brought into slidable contact with a magnetic medium, and at least parts of the third and seventh portions and at least parts of the fourth and sixth portions are respectively stacked and joined to each other.

16 Claims, 15 Drawing Sheets

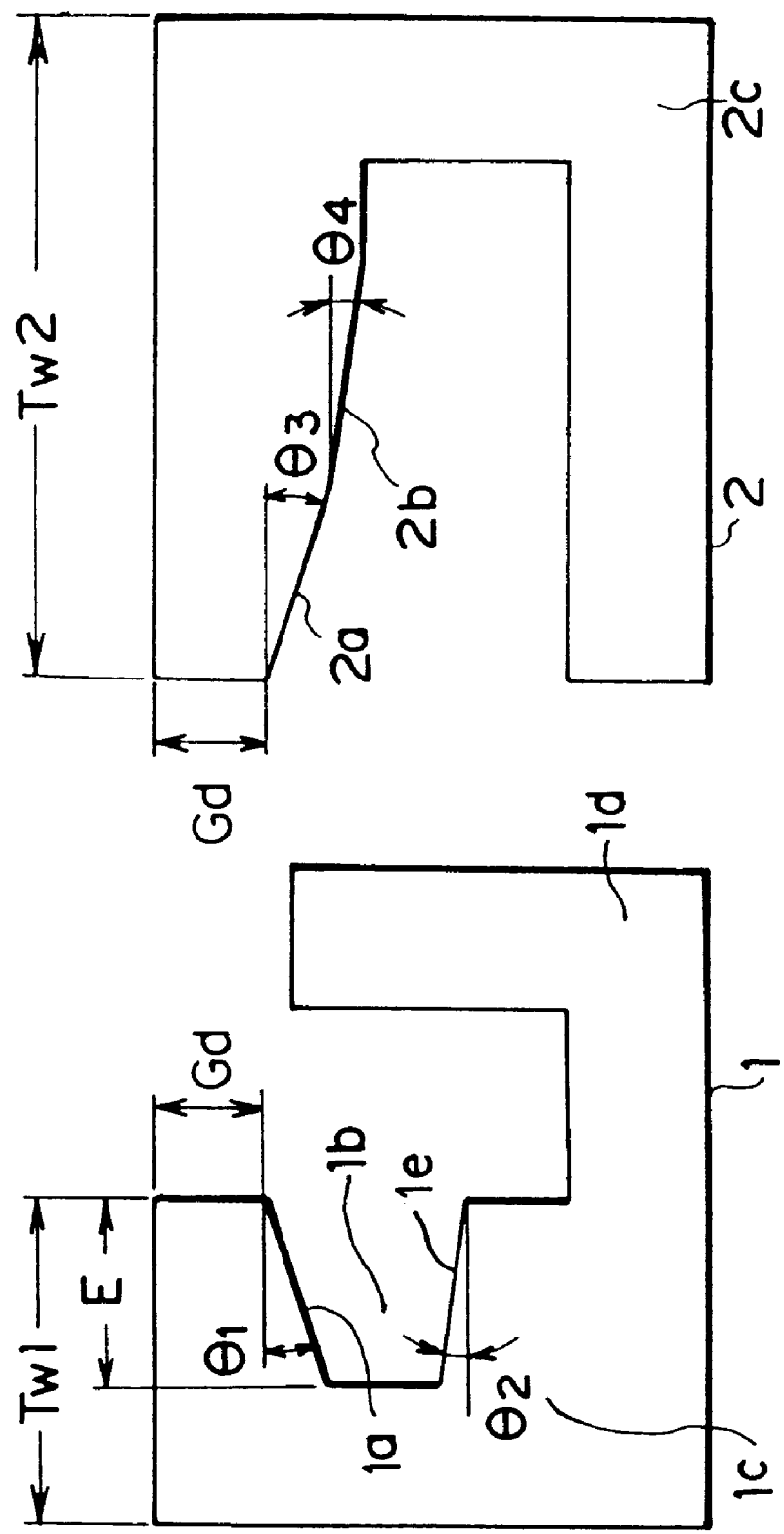

F I G. 4A
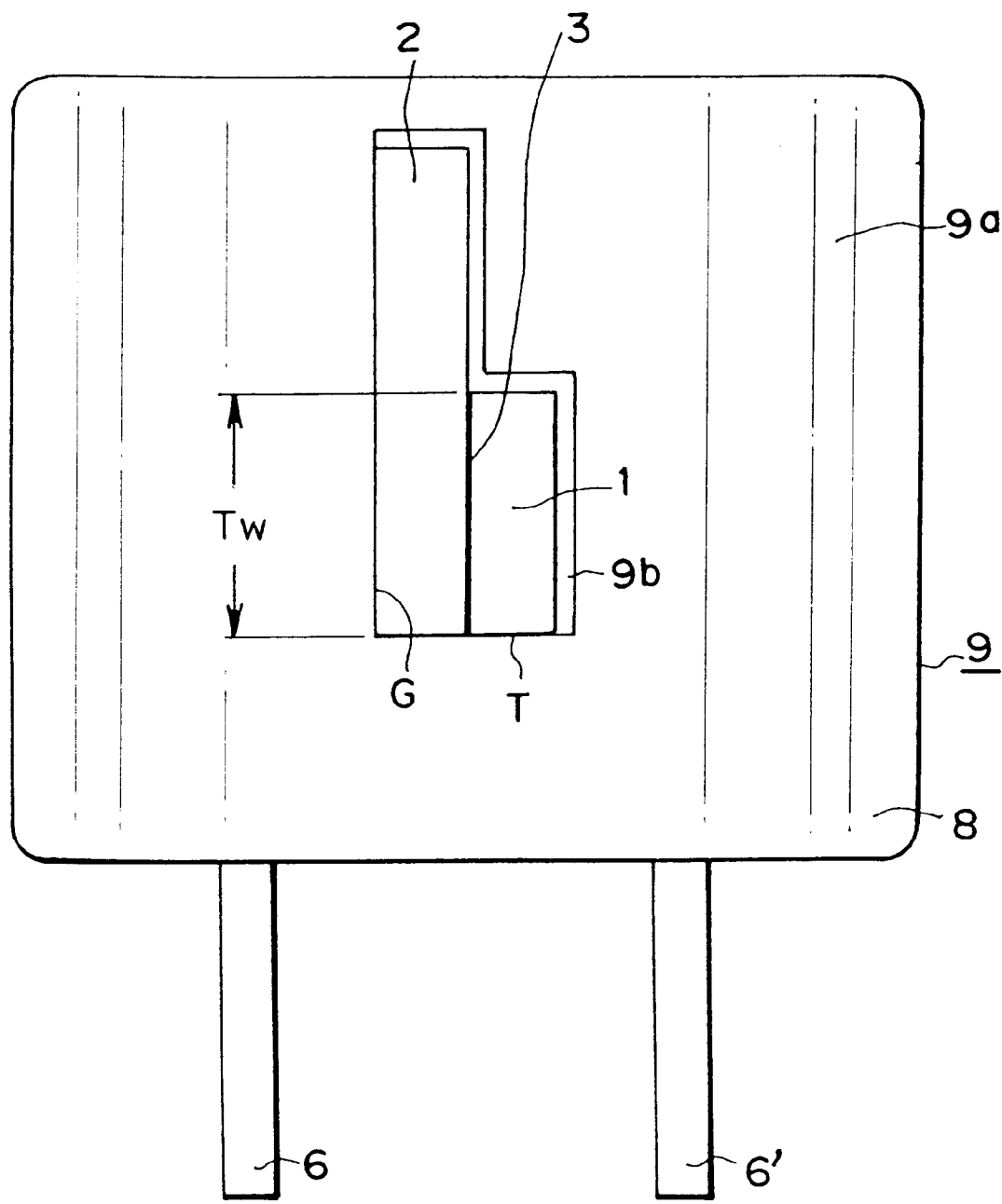

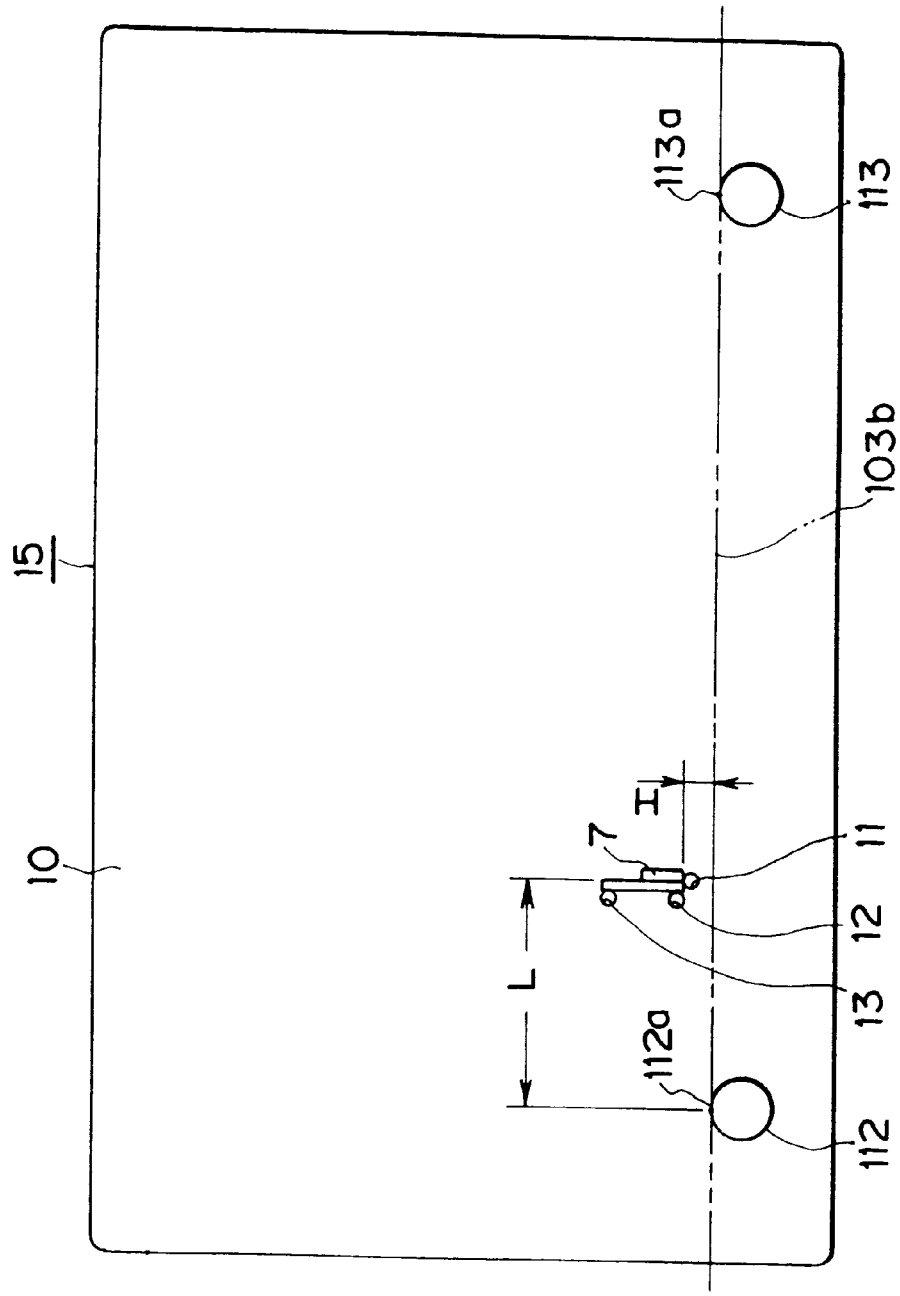

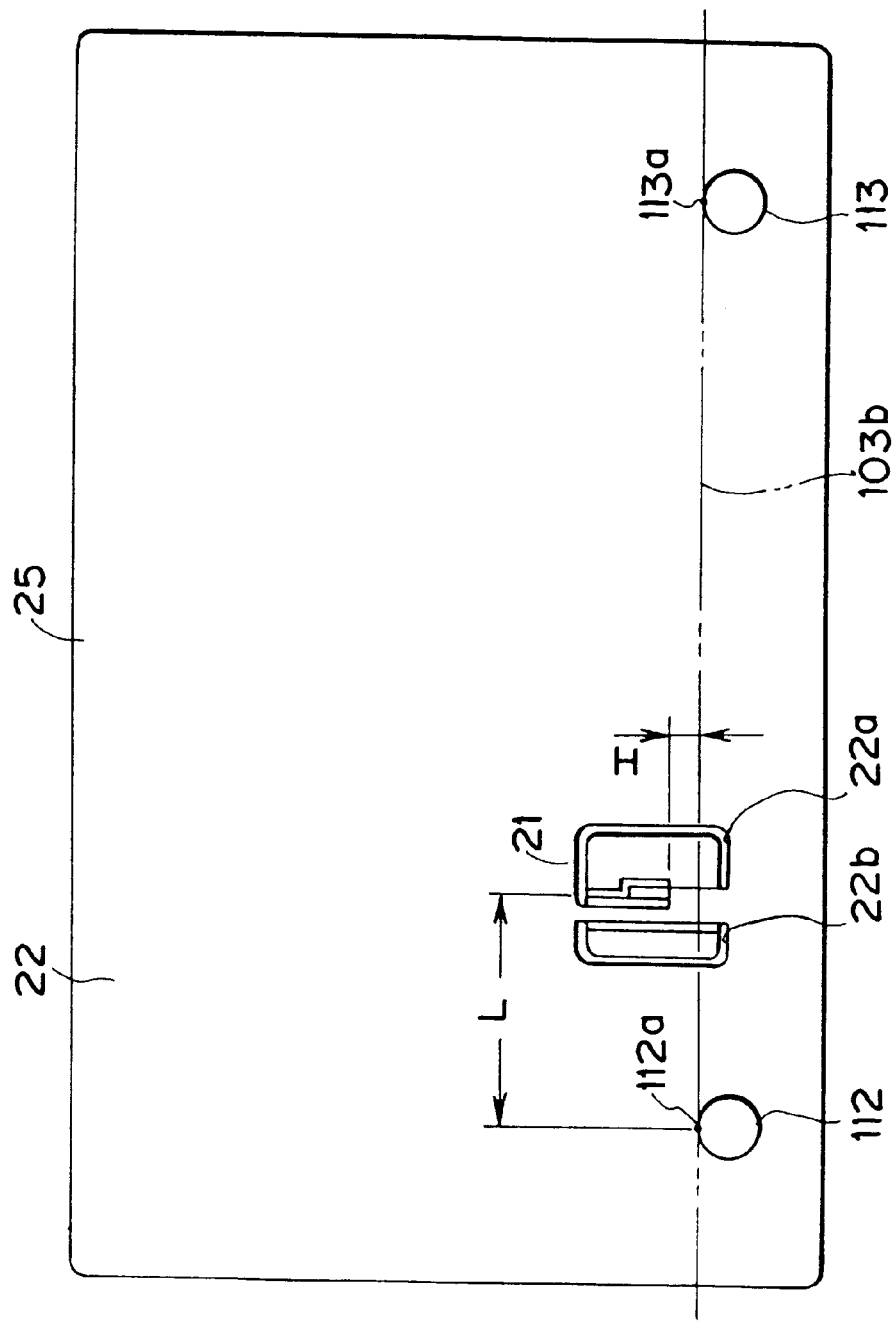

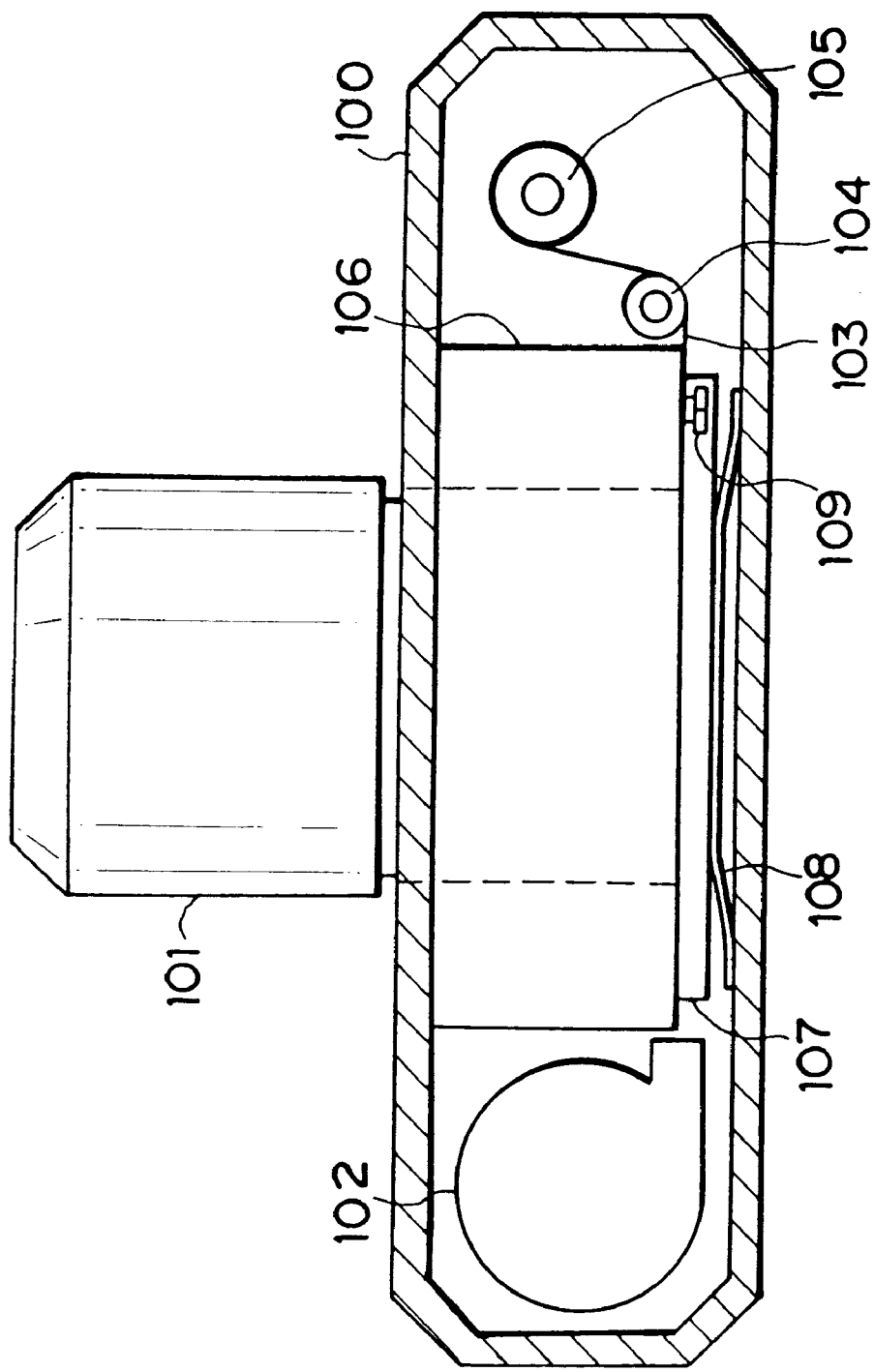

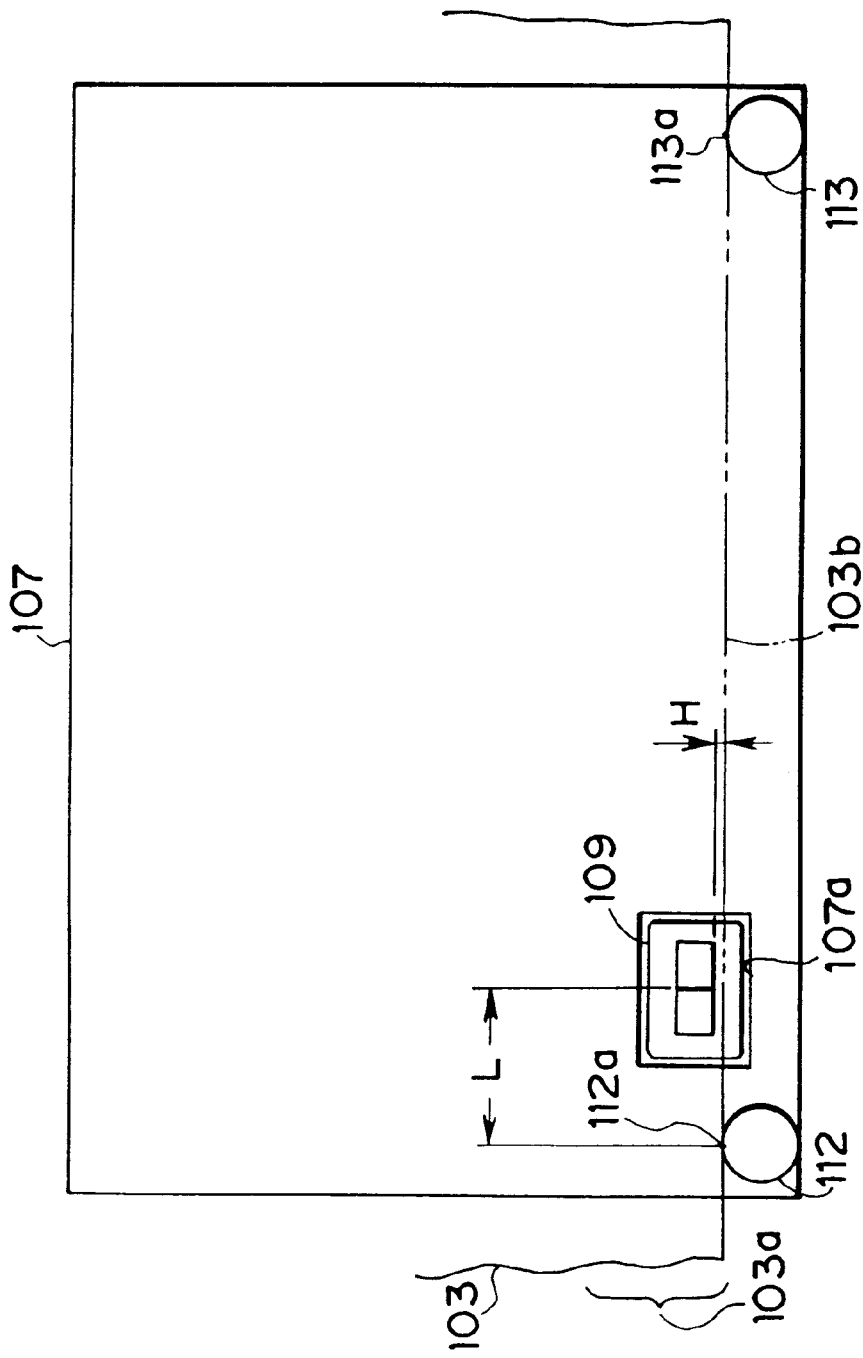

MAGNETIC HEAD ELEMENT, MAGNETIC HEAD, PRESSURE PLATE USING MAGNETIC HEAD ELEMENT OR MAGNETIC HEAD, AND CAMERA USING PRESSURE PLATE

BACKGROUND OF THE INVENTION

The present invention relates to a magnetic head element and magnetic head for a magnetic recording/reproducing apparatus for recording or reproducing information on/from a magnetic medium.

The present invention, in particular, relates to a magnetic head element and magnetic head suitable for a camera having a magnetic head for recording or reproducing information on/from a magnetic storage portion formed on a film, a camera pressure plate having the magnetic head element or magnetic head, and a camera having the pressure plate.

Recently, a camera that uses a film having a magnetic storage portion and can record or reproduce information such as photographing conditions and date on or from the magnetic storage portion has been developed and introduced commercially. Information about the camera includes the number of exposures, shutter speed, f number, exposure correction value, date, title, and the like. The camera incorporates a magnetic head for recording or reproducing these pieces of information on or from a magnetic storage portion of a film.

Recording of these pieces of information on a film allows an easy film change, makes developing/printing processing consistent, and finds application to multimedia equipment using photographic images upon processing them by computers using film scanners. This technique is therefore regarded as a promising technique.

FIG. 9 shows a schematic arrangement of a camera capable of recording or reproducing magnetic information. Referring to FIG. 9, reference numeral 100 denotes a camera body; 101, a lens; 102, a film cartridge loaded in the camera body; and 103, a film fed from the film cartridge 102. FIG. 9 shows a state in which the film 103 is wound around a spool 105 through a guide roller 104. Reference numeral 106 denotes a film guide for guiding the film 103 along a predetermined traveling path; and 107, a pressure plate that holds the film 103 between itself and the film guide 106 and supports a magnetic head 109 for recording or reproducing information so as to make the magnetic head 109 come into slidable contact with the film 103. This pressure plate 107 is elastically supported on the camera body through a pressure plate spring 108.

As shown in FIGS. 9 and 10, the magnetic head 109 for reading/writing magnetic information from or on the film 103 is placed on the pressure plate 107 at a position corresponding to an end portion of the film 103 in the longitudinal direction. Although the location of the magnetic head 109 varies depending on the design of a magnetic storage portion, the magnetic head 109 is located to record or reproduce photographing information in units of frames of the traveling film 103 at a predetermined timing.

When the magnetic head 109 is mounted on the pressure plate 107, a window portion 107a is formed in the pressure plate 107 at a predetermined position, and the magnetic head 109 is exposed to a magnetic storage portion 103a of the film 103, as shown in FIG. 10. At this time, the magnetic head 109 is fixed to the pressure plate 107 with a high precision in terms of the track position, azimuth, and positions in the roll/pitch directions so as to come into slidable contact with film 103.

A pair of guide rods 112 and 113 for helping the film 103 travel and in positioning it to project from the pressure plate 107 toward the film 103 to guide an edge 103b of the film 103.

FIG. 11 shows a general magnetic head element. FIG. 12 shows a magnetic head incorporating the general magnetic head element.

The magnetic head 109 described above has an arrangement like the one shown in FIGS. 11 and 12 and is formed in the following procedure. Magnetic core halves 120 are formed by stacking and joining a plurality of substantially C-shaped core half elements 120a formed by punching or the like using thin magnetic plates (e.g., permalloy or high-hardness permalloy). Surfaces of the magnetic core half 120 between which magnetic gap is to be formed are polished/lapped to form butt surfaces. Thereafter, a coil bobbin 122 having a coil 123 wound therearound is mounted on the rear portion side, and the pair of magnetic core halves 120 are joined to each other to face each other through a nonmagnetic member 121 serving as a magnetic gap, thereby forming a magnetic head. A magnetic head is generally formed in this manner.

The magnetic head formed in this manner is directly mounted in a holding case 125 or mounted in a holder (not shown) and an adhesive is charged into the holder. Thereafter, the film traveling surface is polished/lapped in the form of a curved surface, thereby obtaining a magnetic head 109.

Terminals 124 for electric connection to an external circuit, which are known parts of a conventional magnetic head, may be integrally formed with the coil bobbin 122 described above, or may be formed upright on the holding case and the coil 123 may be connected to the terminals 124.

In a case of a magnetic head having a reproducing function, to prevent the influence of noise from a motor and the like around the magnetic head, the holding case 125 is preferably a shielding case made of a magnetic material.

Demands have arisen for a reduction in the size of the above camera capable of recording or reproducing magnetic information, and hence a thinner pressure plate incorporating a magnetic head has been required.

Demands have also arisen for a reduction in the cost of a camera (a camera in this specification includes a so-called lens-mounted film in this specification) which is capable of recording or reproducing magnetic information and hence capable of recording information such as date. Consequently, a reduction in the cost of parts to be used for such a camera has been required.

In a magnetic head, if cores are formed by stacking a plurality of thin magnetic plates, the part cost increases. In addition, when core half elements are mated with each other, variations in thickness of each core formed by stacking thin magnetic plates varies or a track offset occurs. For this reason, when the magnetic head is positioned in the pressure plate, track position adjustment is required, resulting in an increase in assembly cost. Furthermore, when each core is formed by stacking thin magnetic plates, the surfaces that come into contact with the gap spacer as a magnetic gap cannot be made flush with each other unless they are polished/lapped. For this reason, when the magnetic head is mounted in the holding case, it is difficult to position the magnetic head at the same position in the holding case. Furthermore, since such size variations cause variations in gap position and azimuth precision, many adjustments are required to accurately position the magnetic head on the pressure plate, resulting in an increase in assembly cost.

An azimuth precision below +30° is required according to the specifications. In consideration of various variations, a camera may pose a problem unless it is assembled within this tolerance. For this reason, when a magnetic head is mounted in a pressure plate, adequate adjustments are required.

Moreover, with a reduction in the size of a camera, parts, e.g., a motor used for the camera, serving as noise sources for the magnetic head are mounted near the magnetic head. Demands have therefore arisen for a magnetic head that can sufficiently resist various types of noise.

SUMMARY OF THE INVENTION

The present invention has been made in consideration of the above problems, and has as its object to realize reductions in the size and cost of a magnetic head element and to easily and accurately position the magnetic head element in a mounting operation.

It is another object of the present invention to provide a magnetic head resistant to noise.

It is still another object of the present invention to provide a magnetic head incorporating the magnetic head element that achieves the above objects, a camera pressure plate, and a camera using the camera pressure plate.

In order to achieve the above objects, according to the present invention, for example, there is provided a magnetic head element comprising:

a first magnetic core having a first portion that determines a first track width, a second portion extending from the first portion almost vertically, a third portion that extends from the second portion almost vertically and is longer than the first track width, and a fourth portion extending from the third portion almost vertically, the first to fourth portions forming a substantially rectangular ring-like shape with a portion between the first and second portions being notched;

a second magnetic core having a fifth portion longer than the first track width, a sixth portion extending from the fifth portion almost vertically, and a seventh portion extending from the sixth portion almost vertically, the fifth to seventh portions forming substantially a shape of letter C; and a gap spacer made of a nonmagnetic material and placed between the first and fifth portions, wherein outer circumferential surfaces of the first and fifth portions form a surface to be brought into slidable contact with a magnetic medium, and at least parts of the third and seventh portions and at least parts of the fourth and sixth portions are respectively stacked and joined to each other.

According to another aspect of the present invention, a magnetic head incorporating the magnetic head element described above is provided. The magnetic head comprises, for example, the magnetic head element described above; and a case member having a reference portion used to mount the magnetic head element, wherein the magnetic head element is mounted in the case member while an outer surface of the fifth portion of the magnetic head element is aligned with the reference portion of the case member.

According to another aspect of the present invention, a camera pressure plate incorporating the magnetic head element described above is provided. The pressure plate comprises, for example, the magnetic head element described above; and a pressure plate body integrally molded with the magnetic head element being mounted at a predetermined position, wherein a mold for molding the pressure plate body has a plurality of positioning pins for positioning the magnetic head element, and the plurality of positioning pins determine a position of a side surface of the fifth portion of the magnetic head element in a longitudinal direction and a position of at least one of a surface of the first portion which extends to an outer circumferential surface of the second portion and an outer circumferential surface of the fifth portion on an open end side.

According to still another aspect, a camera comprising the camera pressure plate is provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A and 1B are views for explaining magnetic cores constituting a magnetic head element according to the first embodiment of the present invention;

FIGS. 4A and 4B are views showing a magnetic head incorporating the magnetic head element (FIGS. 3A and 3B) described in the first embodiment;

FIG. 5 is a view showing a camera pressure plate incorporating the magnetic head element shown in FIGS. 3A and 3B;

FIG. 7 is a view showing a pressure plate incorporating the magnetic head according to the fourth embodiment;

FIG. 9 is a schematic view showing an arrangement of a camera capable of recording or reproducing magnetic information;

FIG. 10 is a view for explaining how a magnetic head element is mounted in a general pressure plate;

DETAILED DESCRIPTION OF THE PREFERRED EMBODIMENTS

Preferred embodiments of the present invention will now be described in detail in accordance with the accompanying drawings.

<First Embodiment (Magnetic Head Element)>

Figure 2B:
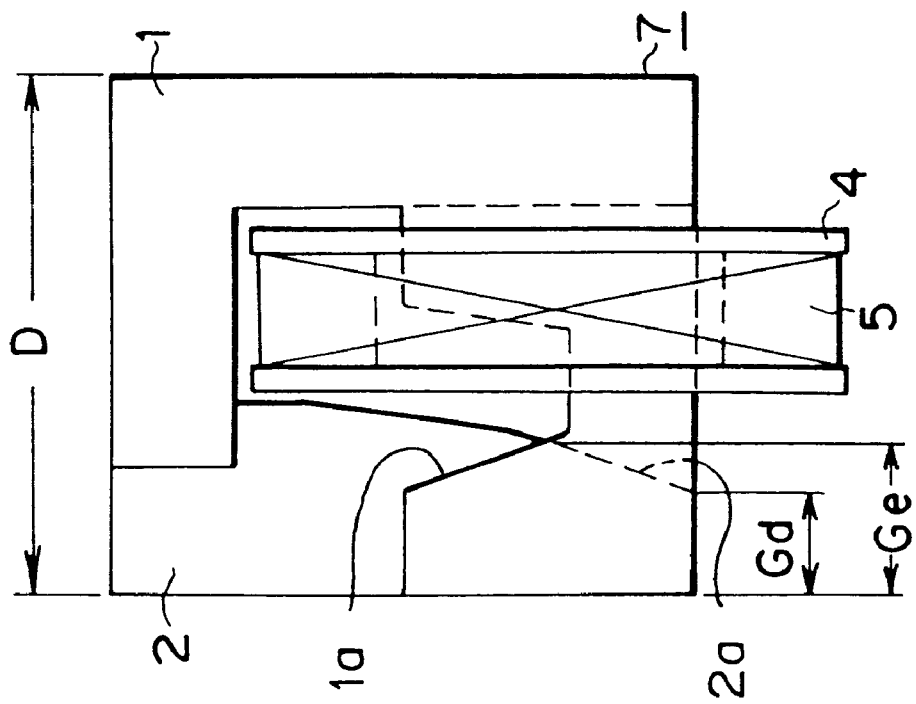
FIGS. 2A and 2B are views showing the magnetic head element according to the first embodiment.
Figure 2A:
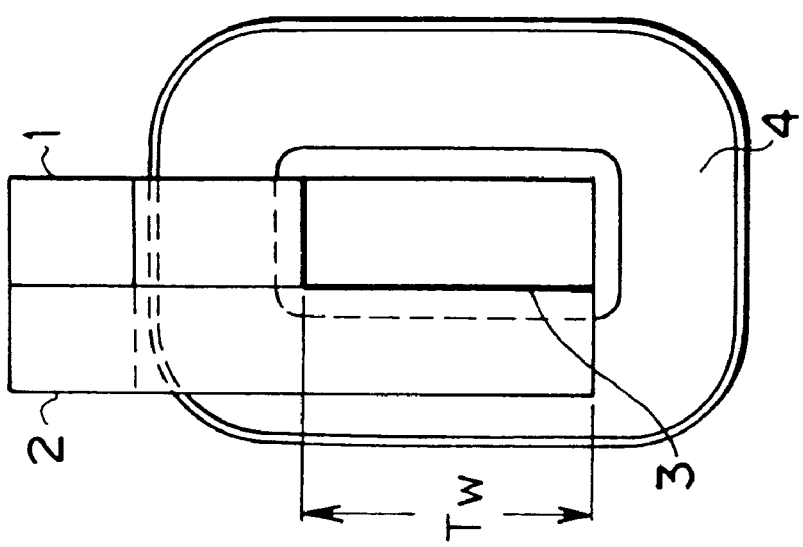

FIGS. 1A and 1B are views for explaining magnetic cores constituting a magnetic head element according to this embodiment. FIGS. 2A and 2B are views showing the magnetic head element of this embodiment. The magnetic head element is formed by assembling the pair of magnetic cores shown in FIGS. 1A and 1B into a unit like the one shown in FIGS. 2A and 2B or FIGS. 3A and 3B.

A magnetic core 1 shown in FIG. 1A is made of a flat magnetic material and has a first portion that determines a track width Tw1, a second portion extending from the first portion substantially vertically, a third portion that extends from the second portion substantially vertically and is longer than the first portion track width, and a fourth portion extending from the third portion substantially vertically. The first to fourth portions form a substantially rectangular ring-like shape having a notched portion between the first and fourth portions. The second portion has a stepped portion on its inner circumferential surface at the boundary between the second and third portions. A C-shaped portion 1c having the first portion as an upper side and the stepped portion of the second portion as a lower side is formed on the upper left portion of the magnetic core 1 in FIG. 1A. The third and fourth portions form an upright portion on the right side of the lower side of the magnetic core 1 in FIG. 1A. This portion will be referred to as an L-shaped portion 1d hereinafter. That is, the magnetic core 1 is shaped such that the C-shaped portion 1c is mounted on the bottom of the L-shaped portion 1d in the shape of letter L rotated counterclockwise through 90°.

Referring to FIG. 1A, the upper side (first portion) of the C-shaped portion 1c is a portion that defines a record or reproduce track width and has the width Tw1. The first portion defining the track width Tw1 of the magnetic core 1 has a predetermined record or reproducing gap depth Gd on the open end side. The first portion has an inclined portion 1a extending from the lower end to the second portion at a predetermined angle θ1. The C-shaped portion 1c also has an inclined portion 1e having a predetermined angle θ2 on the lower side. These inclined portions 1a and 1e form a trapezoidal notched portion 1b on the C-shaped portion 1c. Note that the angle θ1 is preferably within the range of 15 to 25°, and more preferably 18°. Also, the angle θ2 is preferably within the range of 0 to 15°, and more preferably 80°. In addition, a depth E of the trapezoidal notched portion 1b is preferably 2/3 or less the track width Tw1.

The L-shaped portion 1d is an extended core portion for decreasing the reluctance of the magnetic circuit formed when the magnetic core 1 is joined to the magnetic core in FIG. 1B (to be described later) and preventing the saturation of the cores.

A magnetic core 2 shown in FIG. 1B is made of a flat magnetic material and has a fifth portion, a sixth portion extending from the fifth portion substantially vertically, and a seventh portion extending from the sixth portion substantially vertically. These fifth to seventh portions form a substantially C-shaped portion. The fifth portion as the upper side portion of the magnetic core 2 has a track width Tw2 larger than the track width Tw1 of the magnetic core 1. Note that the track width Tw2 preferably falls within the range of 1.5 to 3 times the track width Tw1, and more preferably twice the track width Tw1.

The open end of the upper side portion (fifth portion) of the magnetic core 2 has a predetermined record or reproducing gap depth Gd, like the magnetic core 1. An inclined portion 2a extends from the lower end of the upper side portion of the magnetic core 2 at a slant angle θ3. In this case, the slant angle θ3 is preferably equal to the slant angle θ1 of the magnetic core 1.

In addition, the magnetic core 2 has an inclined portion 2b contiguous with the inclined portion 2a and having a slant angle θ4 different from that of the inclined portion 2a. In this case, the angle θ4 is preferably within the range of 0 to 15°, and more preferably 8°.

The magnetic cores 1 and 2 described above are joined to each other, as shown in FIGS. 2A and 2B. More specifically, the two magnetic cores are stacked on each other such that the inclined portion 1a of the magnetic core 1 and the inclined portion 2a of the magnetic core 2 cross each other in opposite directions, and one side end face of that portion of the magnetic core 1, which has the track width Tw1 is aligned to the corresponding portion of the magnetic core 2. The side surfaces (roll surfaces of the flat magnetic members) of the two magnetic cores are joined to each other with a means such as an adhesive or weld, thereby forming a magnetic circuit. When the magnetic cores 1 and 2 are joined to each other, the first portion as the upper side portion of the magnetic core 1 is joined to the fifth portion as the upper side portion of the magnetic core 2 through a nonmagnetic spacer 3 serving as a magnetic gap. In addition, the side surfaces of the third and fourth portions of the magnetic core 1 are respectively joined to the side surfaces of the seventh and sixth portions of the magnetic core 2.

An intersection Ge between the inclined portions 1a and 2a is defined by the slant angles θ1 and θ3. These inclined portions are assembled as shown in FIG. 2B to improve the magnetic saturation characteristics owing to the inclined portions having the angles θ1 and θ3. In addition, the track width Tw2 of the magnetic core 2 is sufficiently larger than the track width Tw1 of the magnetic core 1. Even if, therefore, these portions are joined to each other with a slight offset, the track width of the assembled magnetic head element does not become smaller than a predetermined track width Tw. That is, a required track width can be simply ensured with the track width Tw1 of the magnetic core 1.

Note that as the nonmagnetic spacer 3, a nonmagnetic metal foil such as titanium or beryllium copper foil may be used. Such a metal foil may be formed on one or both of the magnetic cores by a known method such as coating, deposition, or sputtering.

When the magnetic cores 1 and 2 are joined to each other, a coil bobbin 4 having a coil 5 wound therearound is mounted on the 1C-shaped portion 1c, of the magnetic core 1, on which the notched portion 1b is formed, as shown in FIGS. 2A and 2B, thus forming a magnetic head element 7.

In this case, if the inner diameter of the coil bobbin 4 is set to be smaller than the track width Tw1 of the magnetic core 1, the coil bobbin 4 can be easily assembled, and a depth D of the head can be reduced. This size influences reductions in the size and profile of the camera, and its reduction is in great demand. The magnetic head element of this embodiment can meet such a requirement and promote reductions in the size and profile of the camera.

According to the above arrangement of the magnetic head cores, since the inclined portions 1a and 2a cross each other in opposite directions as shown in FIG. 2B, saturation of the magnetic cores is prevented, and the magnetic saturation characteristics improve. More specifically, when inclined portions like those shown in FIG. 2B are formed and assembled in different positions, even if one core having a smaller cross-sectional area begins to become saturated, since the other core has a wider cross-sectional area, simultaneous saturation of the two cores is prevented. If no inclined portion is formed, the two cores become saturated at once throughout the track width when the magnetic flux amount exceeds the saturation flux density of the cores.

In addition, with the inclined portion 2b, the distance between the coil 5 and the upper portion of the magnetic core 2 can be held. This can reduce the flux leakage between the magnetic core 2 and the coil 5. For this purpose, the angle θ4 is preferably set to 0°. To maintain the part strength, however, the angle θ4 is set to be larger than 0°, thus satisfying both requirements for the prevention of flux leakage and increase in part strength.

In addition, that portion (the lower side portion of the C-shaped portion in FIG. 1A) of the magnetic core 1 on which the coil bobbin 4 is mounted is preferably as thick as possible in the thickness direction of the coil bobbin 4. If, however, this portion is made thick, the inclined portion 1e approaches the inclined portion 1a, resulting in flux leakage. The inclined portion 1e having the angle θ2 is therefore formed to make the coil bobbin mounting portion sufficiently thick while ensuring a sufficient distance between the lower side portion of the C-shaped portion 1c and the upper side portion. If a sufficient distance in terms of flux leakage can be ensured between the inclined portion 1e and the inclined portion 1a while a sufficient thickness of the coil bobbin mounting portion is maintained without inclining the portion 1e, the angle θ2 may be set to 0°.

Figure 3A:
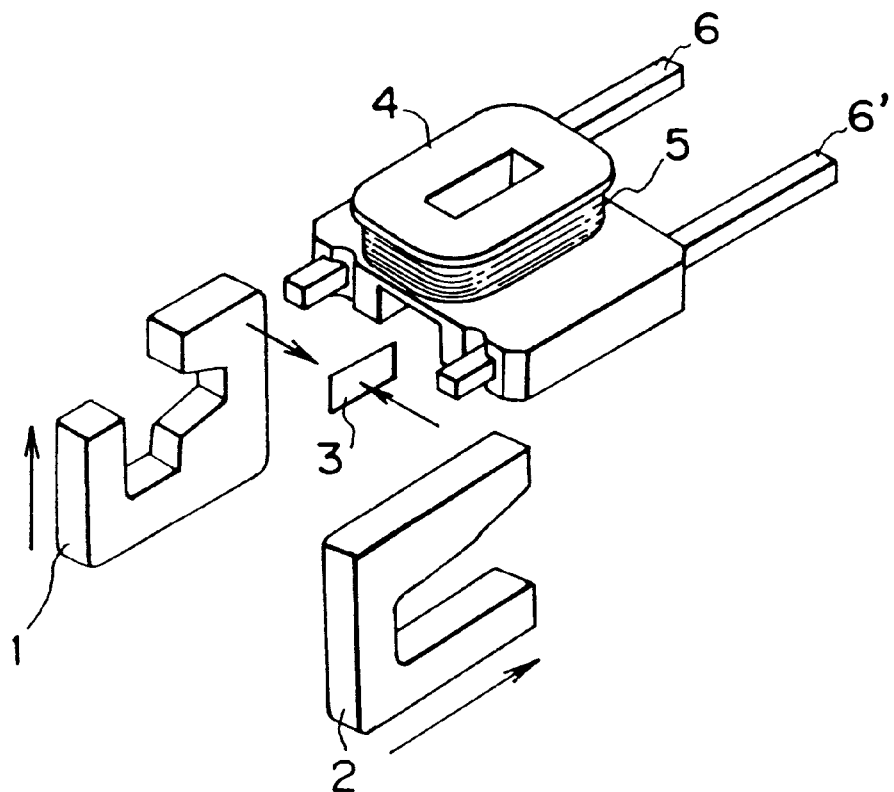
FIGS. 3A and 3B are perspective views showing the magnetic head element using the magnetic cores and coil bobbin shown in FIGS. 1A, 1B, 2A, and 2B.
Figure 3B:
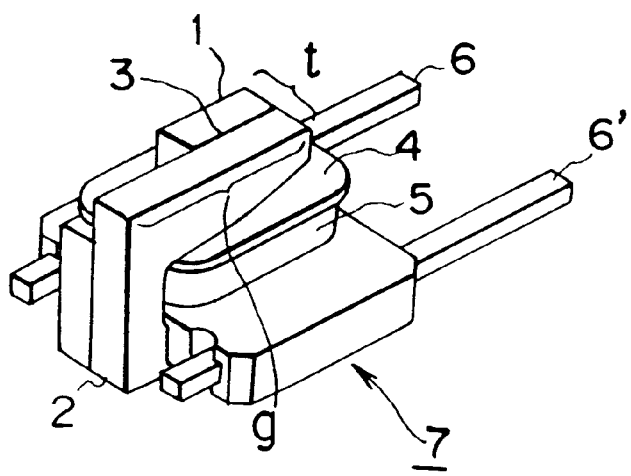

FIGS. 3A and 3B are perspective views showing the magnetic head element using the magnetic cores and coil bobbin in FIGS. 1A, 1B, 2A, and 2B. Referring to FIGS. 3A and 3B, the end portions of the coil 5 wound around the coil bobbin 4 are connected to terminals 6 and 6' to form a coil assembly. As shown in FIG. 3A, the magnetic cores 1 and 2 are combined with this coil assembly through the gap spacer 3, as shown in FIG. 3A, to form the magnetic head element 7 as shown in FIG. 3B.

As described above, according to the magnetic head element of this embodiment, easy assembly of a magnetic head element is realized, and the depth of the head can be reduced to attain a reduction in the size of the magnetic head. In addition, the inclined portions 1a and 2a improve the magnetic saturation characteristics. In addition, the L-shaped portion of the magnetic core 1 increases the area of the joint surface between the magnetic cores 1 and 2 to attain a reduction in reluctance and improvement in magnetic saturation characteristics.

Furthermore, as will be described in the following embodiment, a portion g and end face (FIG. 2B) t of the magnetic core 2 having the track width Tw2 allow easy azimuth adjustment and easy track position adjustment in mounting the magnetic head element in an apparatus. This point will be clarified in the following embodiment described below.

<Second Embodiment (Magnetic Head)>

Figure 4B:
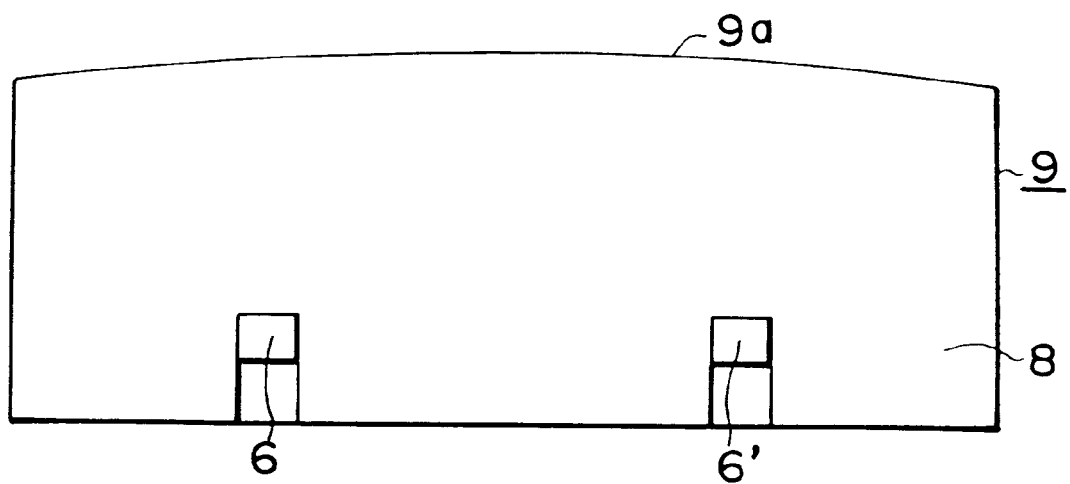

FIGS. 4A and 4B show a magnetic head incorporating the magnetic head element (FIG. 3B) described in the first embodiment. The magnetic head element 7 shown in FIG. 3B is mounted and fixed in a case 8, and a side surface 9a that comes into contact with a film is polished/lapped in the shape of letter R (cylindrical surface), thereby forming a magnetic head 9.

Note that terminals 6 and 6' for connection to an external circuit may be integrally formed with a coil bobbin 4 and connected to a coil 5 to be provided as a coil assembly, as described with reference to FIGS. 3A and 3B, or may be formed upright on the case 8 and connected to a coil 5.

The magnetic head element 7 is mounted in the above case 8 while pressed against a reference surface T, which bears the joined surfaces (the portion t in FIG. 3B) of magnetic cores 1 and 2, and a reference surface G, which bears the entire side surface (the portion g in FIG. 3B) of the portion (the upper side portion in FIG. 1B) of the magnetic core 2 which has a track width Tw2, with reference to the outer shape of the case 8. With this structure, a high track position precision and azimuth (slant) precision can be easily maintained. Therefore, the magnetic head element can be positioned by simply mounting the magnetic head while pressing it against the reference position of the pressure plate 107 described above with reference to FIGS. 9 and 10. This can attain simplification of assembly.

A portion 9 b in FIG. 4A is a gap formed when the magnetic head element 7 is mounted in the case 8 while pressed against the reference surfaces G and T, as described above. This portion is filled with a resin to fix the magnetic head element 7 to the case 8.

In this case, the azimuth precision is determined when that portion g of the magnetic core 2, which has the track width Tw2 is pressed against the reference surface G. As described in the first embodiment, the track width Tw2 of the magnetic core 2 is 1.5 or 3 times (preferably twice) the track width Tw in the prior art. In general, a case holding a magnetic head element has a window for exposing a slide surface, and the size of this window is slightly larger than the thickness of a core. That is, a certain gap is present between the window and magnetic head element along the track width direction. If, therefore, the cores move without tightly contacting the reference surface, an offset occurs within the range of the gap amount. According to the magnetic head element of this embodiment, however, even if an offset occurs by the same gap amount as that of the general magnetic head (having the track width Tw almost equal to the size of the magnetic head element in the track width direction), the azimuth precision is as high as 1/1.5 to 1/3 (1/2 if Tw2 is twice Tw) that obtained when the conventional magnetic head element is used. In addition, since the size of the magnetic head element in the thickness direction of the cores perpendicular to the track width is as small as the total thickness of the magnetic cores 1 and 2, variations in track position due to tilt are small (in the conventional magnetic head element having a large size in the thickness direction of the cores, variations in track position due to tilt are large).

When a reproducing head uses the structure of this magnetic head 9, in particular, the core area exposed to the slide surface becomes considerably smaller. Therefore, the amount of ambient noise flowing into the magnetic cores becomes small, and the magnetic head suffers less from noise.

<Third Embodiment (Camera Pressure plate (First))>

A camera pressure plate incorporating the magnetic head element 7 in a third embodiment will be described next with reference to FIGS. 3A and 3B. FIG. 5 shows the camera pressure plate incorporating the magnetic head element in FIG. 3. As shown in FIG. 5, when a film pressure plate 10 is formed by using a plastic material, the pressure plate 10 and the magnetic head element 7 are integrally formed by molding. Therefore, the pressure plate 10 shown in FIG. 5 can be regarded as a magnetic head 15 as a whole.

The pressure plate 10 has guides 112 and 113 for guiding a film, and holes 11 to 13 which are formed by three pins formed on a mold for forming the pressure plate 10. The pins that form the holes 11 to 13 in FIG. 5 will be respectively referred to as the first to third positioning pins. hereinafter.

These three positioning pins are formed on the mold for forming the pressure plate 10. The first positioning pin is placed to position the end faces of the magnetic cores 1 and 2 which are aligned with each other (the portion t in FIG. 3B) at a position separated by a distance H corresponding to the distance from a line connecting a film contact ends 112a and 113a of the guides 112 and 113 for guiding an edge 103b of the film to the track position. The second and third positioning pins determine the position of the magnetic core 2 on the side surface (portion g in FIG. 3B) corresponding to the track width Tw2. The second and third positioning pins therefore determine the gap position of the magnetic core 2 (the position corresponding to a distance L from the contact end 112a of the guide 112 in this case) and azimuth position.

Molding is performed while the portion t of the magnetic head element 7 is held by the first positioning pin in tight contact and the portion g of the head element 7 is held by the second third positioning pins in tight contact. As a consequence, the holes 11 to 13 are formed at the positions shown in FIG. 5, and the magnetic head element 7 is incorporated in the pressure plate 10. Note that the cross-sectional shape of each positioning pin is not limited to a circle, and may take any shape such as a rectangle.

When the slide surface of the magnetic head element 7 which comes into contact with a film needs to be finished, the magnetic head element 7 is polished/lapped in advance, and the magnetic head element 7 is mounted in the pressure plate 10 by using the polished/lapped surface as a reference surface. With this operation, the positions of the magnetic head in the roll and pitch directions are accurately determined.

The azimuth precision is determined when that portion of the magnetic core 2 which has the track width Tw2 is pressed against the second and third positioning pins. The track width Tw2 of the magnetic core 2 is 1.5 to 3 times (preferably twice) the track width Tw in the prior art. For this reason, even if the magnetic cores are offset by the same gap, the azimuth precision in this embodiment is as high as 1/1.5 to 1/3 (1/2). In addition, the thickness of the core is equal to the total thickness of the core members so that variations in track position due to tilt are small. That is, the magnetic head element can be accurately positioned by only pressing the magnetic head element 7 against the positioning pins.

As described above, according to the third embodiment, since the pressure plate 10 and magnetic head element 7 can be integrally formed by molding, no case is required. Hence, the number of parts and the number of steps can be decreased. In addition, since the magnetic head element 7 can be easily positioned with high precision, a great reduction in assembly cost can be attained.

<Fourth Embodiment (Camera Pressure Plate (Second))>

In the third embodiment, the magnetic head element 7 is incorporated in the camera pressure plate. In contrast to this, in the fourth embodiment, a magnetic head element 7 is housed in a case to form a magnetic head, and the case is mounted on a camera pressure plate.

In the fourth embodiment, since the magnetic head element 7 is enclosed with the case made of a magnetic material such as permalloy, the resistance to ambient noise improves. Even if, therefore, a noise source such as a motor is present near the magnetic head owing to a reduction in the size of the camera, the head functions without any operation error as a record or reproducing magnetic head.

Figure 6A:
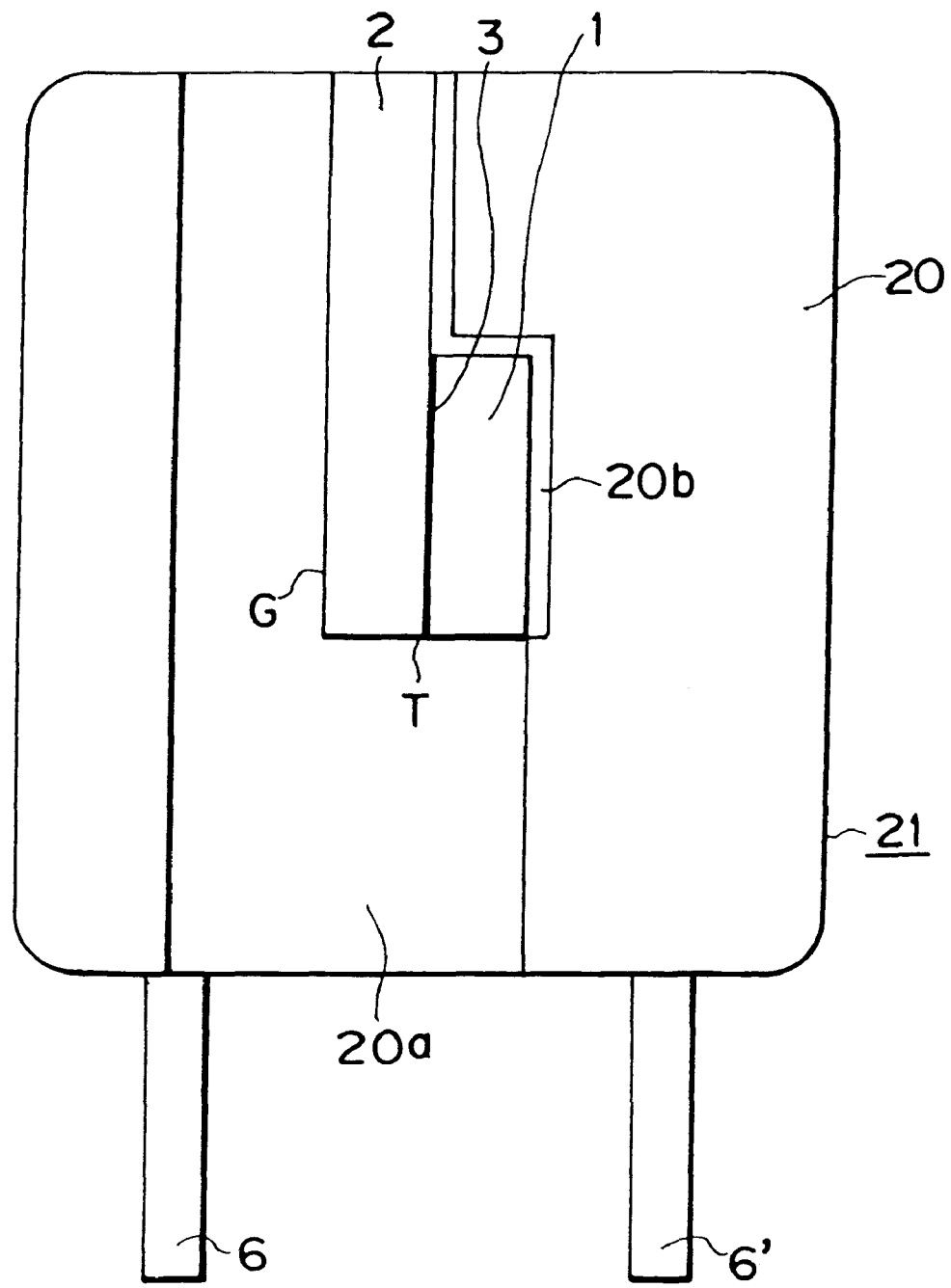
FIGS. 6A and 6B are views showing a magnetic head according to the fourth embodiment.
Figure 6B:
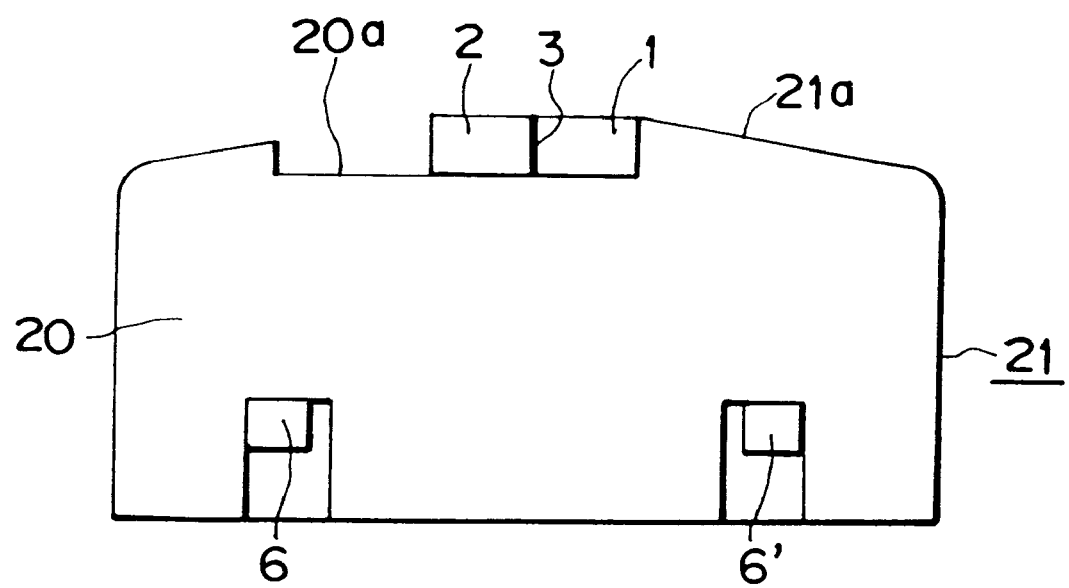

FIGS. 6A and 6B show a magnetic head according to the fourth embodiment. Referring to FIGS. 6A and 6B, a case 20 has a notched portion 20a to expose the aligned end faces (the portion t in FIG. 3B) of magnetic cores 1 and 2 and a side surface (the portion g in FIG. 3B) corresponding to the track portion of the magnetic core 2. After a magnetic head element 7 is housed/fixed in the case 20, a film traveling surface 21a is polished/lapped to form a magnetic head 21.

As in the second embodiment, the magnetic head element 7 is mounted in the case 20 while being pressed against a reference surface T, which bears the aligned end faces (the portion t in FIG. 3B), and a reference surface G, which bears the side surface (the portion g in FIG. 3B) of the portion (upper side portion in FIG. 1B) corresponding to the track width Tw2 of the magnetic core 2, with reference to the outer shape of the magnetic head element 7. A portion 20b in FIG. 6A is the gap formed when the magnetic head element 7 is mounted in the case 20 in tight contact with the reference surfaces T and G. This portion is filled with a resin to fix the magnetic head element 7.

FIG. 7 shows a pressure plate incorporating the magnetic head according to the fourth embodiment. The magnetic head 21 in FIG. 6 is positioned to face a head positioning hole 22a formed in a pressure plate 22, and the notched portion 20a is brought into tight contact with a positioning portion 22b formed on the pressure plate 22 to be fixed, as shown in FIG. 7, thereby setting a track position H, gap position L, and azimuth position. When the aligned end faces (the portion t) of the magnetic cores 1 and 2 and the side surface (portion g) of the track portion of the magnetic core 2, which are exposed through the notched portion 20a, are pressed against the positioning portion 22b, the magnetic head 21 can be easily positioned.

In this case, the magnetic head 21 in the case made of permalloy or the like can be easily positioned in the pressure plate 22 as in the third embodiment, and the amount of ambient noise on the magnetic cores decreases, thus realizing a magnetic head on which noise has little influence.

In this embodiment, since the head positioning hole 22a having the positioning portion 22b shown in FIG. 7 is formed in the pressure plate, even a pressure plate formed from a metal plate material by press working can be used instead of a pressure plate made of a plastic material by molding.

<Fifth Embodiment (Camera Pressure Plate (Third))>

In the fourth embodiment, the aligned end faces (portion t) of the magnetic cores 1 and 2 of the magnetic head element and the side surface (portion g) of the track portion of the magnetic core 2 are exposed to be accurately positioned. In contrast to this, in the fifth embodiment, there is provided a structure which reduces the exposed portion of a magnetic head element 7 to improve the noise resistance, and allows the magnetic head element 7 to be easily positioned in a pressure plate.

Figure 8A:
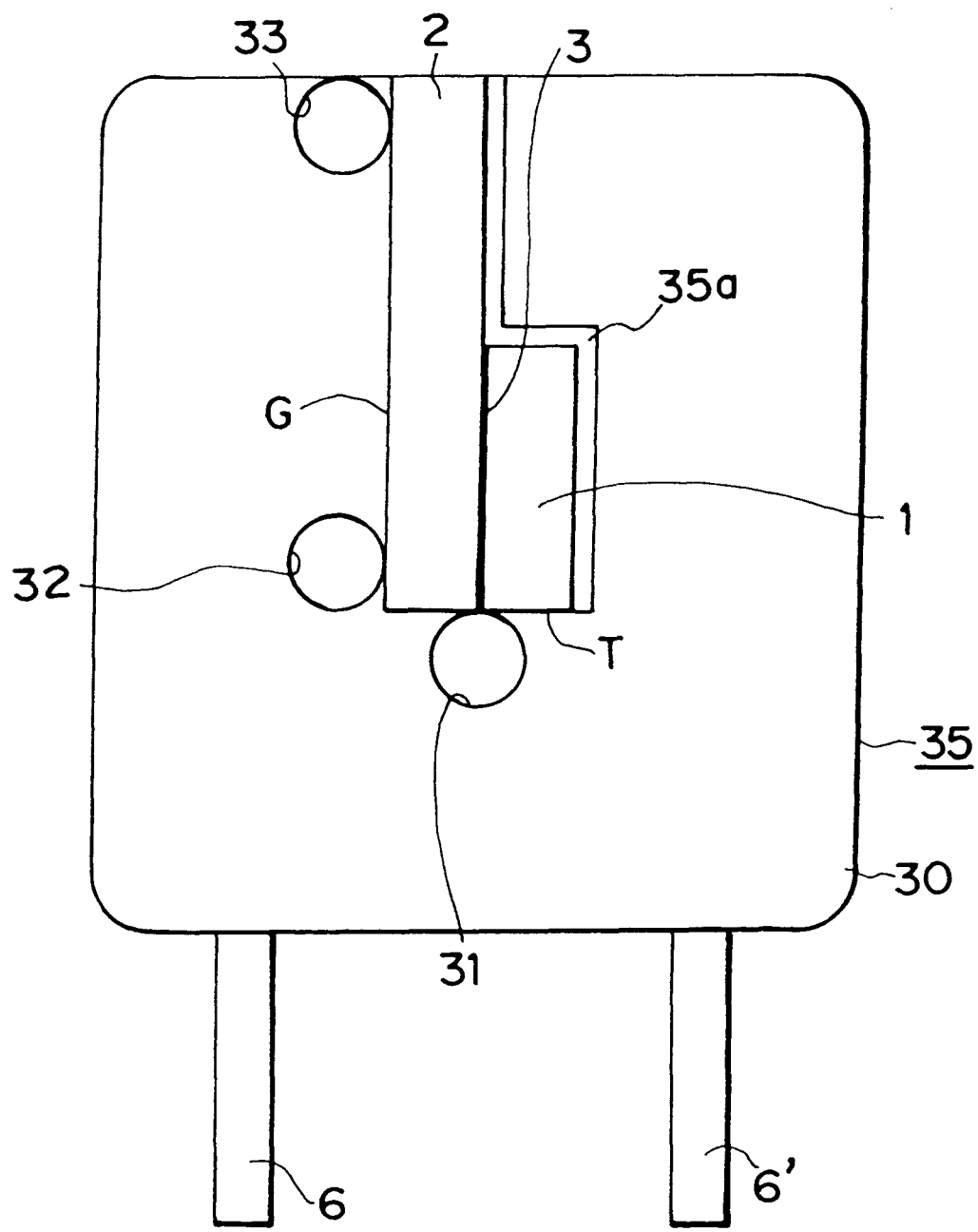
FIGS. 8A and 8B are views showing a magnetic head according to the fifth embodiment.
Figure 8B:
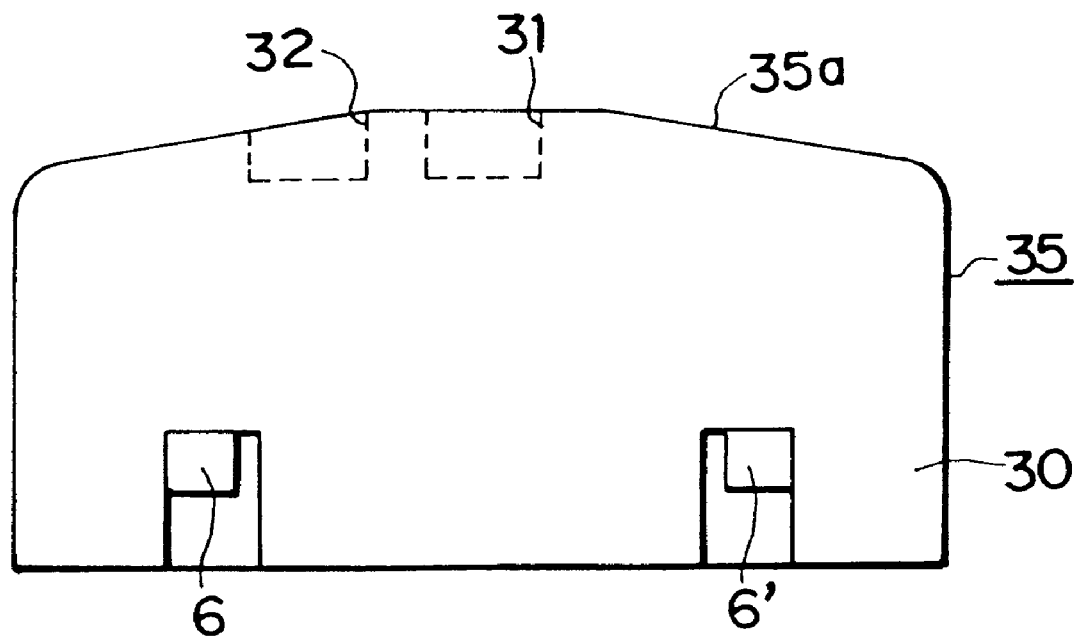
Figure 11:
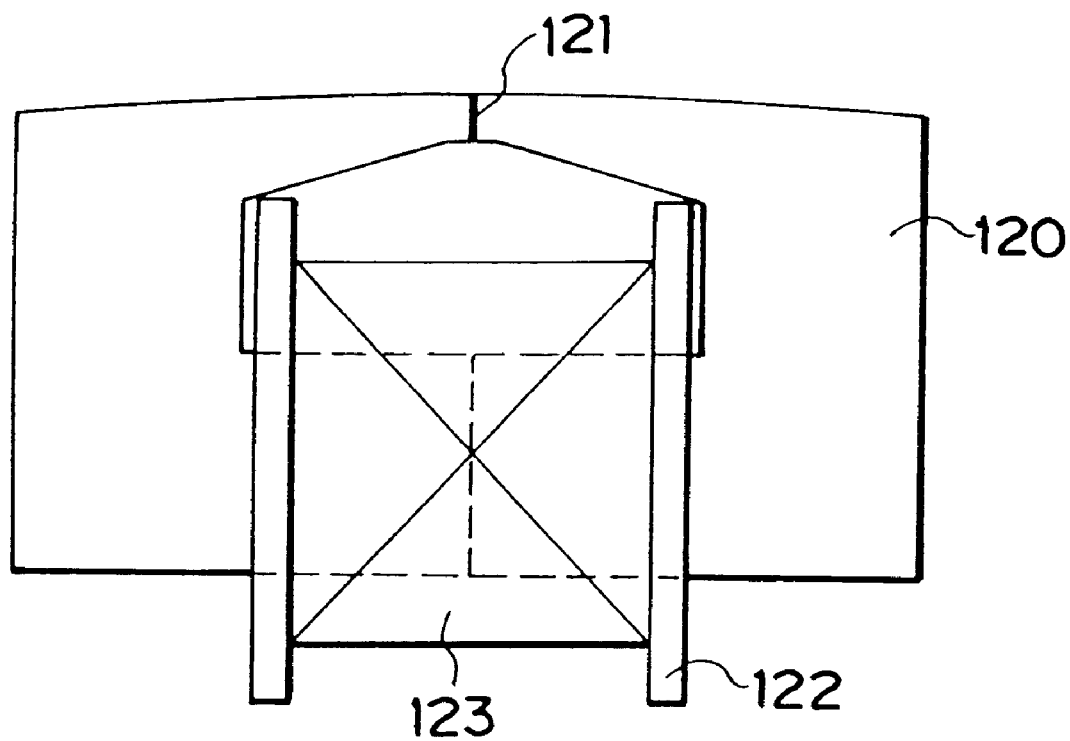
FIG. 11 is a view showing a general magnetic head element.
Figure 12:
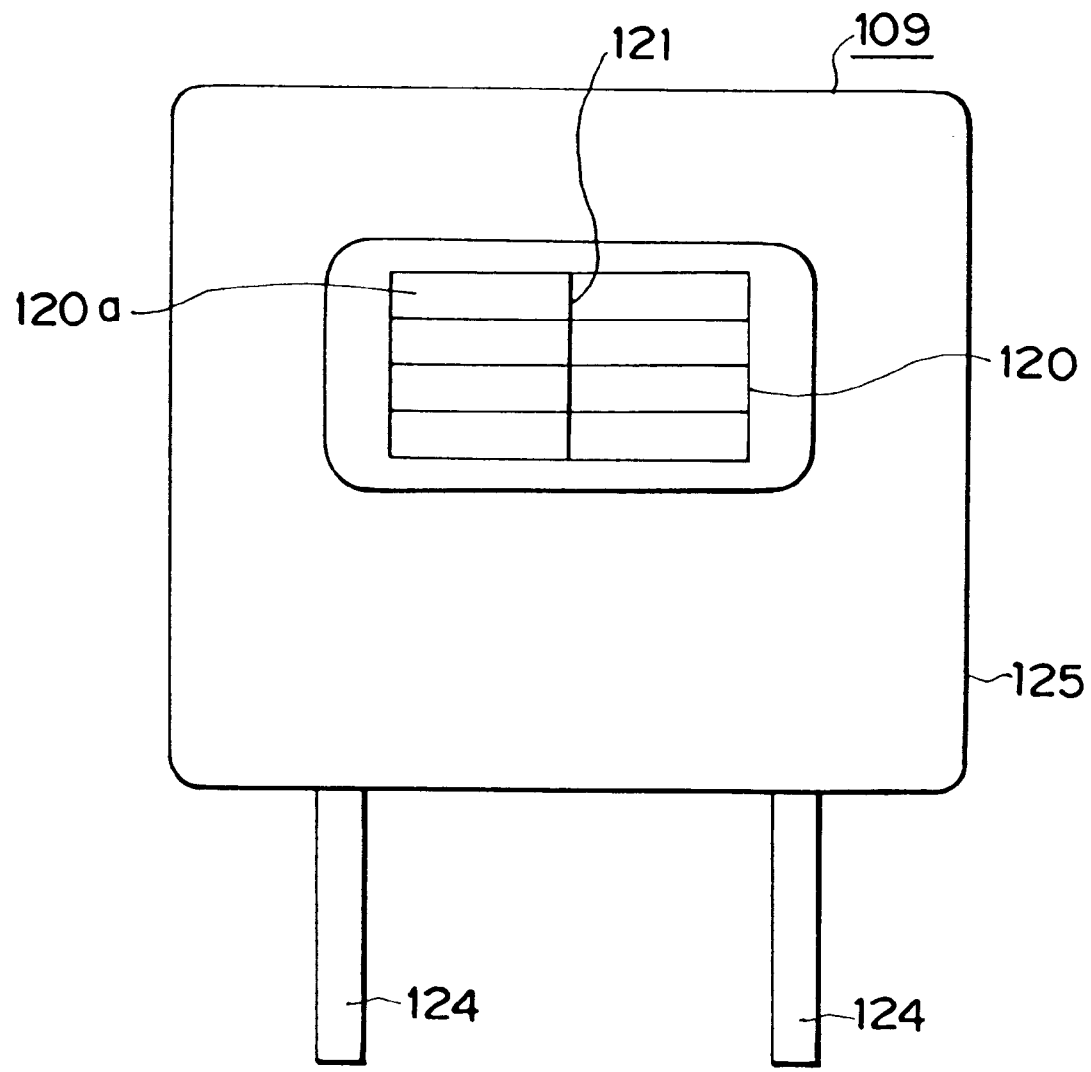
FIG. 12 is a view showing a magnetic head incorporating the general magnetic head element.

FIGS. 8A and 8B show a magnetic head according to the fifth embodiment. As shown in FIGS. 8A and 8B, in the fifth embodiment, a positioning hole 31 for positioning the aligned end faces of magnetic cores 1 and 2 and positioning holes 32 and 33 for determining a gap position L and azimuth position of the magnetic core 2 are formed in a case 30 in place of the notched portion 20a formed in the case 20 in the fourth embodiment described with reference to FIGS. 6A and 6B. These positioning holes 31, 32, and 33 are accurately positioned with respect to reference surfaces T and G against which a magnetic head element 7 is to be pressed. As in the second and fourth embodiments, portions t and g of the magnetic head element 7 are brought into tight contact with the reference surfaces T and G, and a portion 35a is filled with a resin, thereby housing/fixing the magnetic head element 7 in the case 30.

When a magnetic head 35 obtained in this manner is mounted in a pressure plate, the magnetic head may be positioned in the pressure plate with the positioning holes 31, 32, and 33 by using a positioning apparatus (jig), or may be integrally molded with the pressure plate, as in the third embodiment.

As in the third embodiment, positioning pins for positioning the magnetic head element 7 may be formed on a mold for a magnetic head in advance, and the magnetic head element 7 may be positioned with these positioning pins and molded/mounted in the pressure plate. In this manner, the magnetic head element 7 can be integrally mounted in the pressure plate to form the magnetic head 35, and the positioning holes 31 to 33 are also formed by these positioning pins.

As described above, according to the magnetic head used in each embodiment described above, since the magnetic cores are made of flat magnetic members, a reduction in the cost of each magnetic core can be attained, and a predetermined track width can be easily ensured. In addition, a high azimuth precision can be ensured by combining a magnetic core having a predetermined track width and a magnetic core having a track width 1.5 to 3 times the predetermined track width, and the magnetic cores can be easily positioned with respect to a camera pressure plate or the like, thus easily attaining a high precision in azimuth positioning.

In addition, since the side surfaces of the magnetic members are joined to each other such that the inclined portions (1a, 2a), each extending from the lower end of the portion having the gap depth at the predetermined angle, cross each other in opposite directions, saturation of the magnetic cores can be prevented.

In the second to fifth embodiments, the aligned end faces of the magnetic cores 1 and 2 are defined as the portion t. However, as a portion used for positioning, one or both of end faces of the core 1 or 2 at the portion t may be used.

Obviously, the pressure plate in each of the third to fifth embodiments described above can be mounted as the pressure plate 107 in FIG. 9 in a camera to provide a camera having a magnetic head element like the one in the first embodiment.

As has been described above, according to the present invention, reductions in the size and cost of a magnetic head can be attained, and a magnetic head element can be easily and accurately positioned in mounting operation.

According to the present invention, a magnetic head resistant to noise is provided.

As many apparently widely different embodiments of the present invention can be made without departing from the spirit and scope thereof, it is to be understood that the invention is not limited to the specific embodiments thereof except as defined in the claims.

What is claimed is:

1. A magnetic head element comprising:
    a first magnetic core having a first portion that determines a first track width, a second portion extending from the first portion substantially vertically, a third portion that extends from the second portion substantially vertically and is longer than the first track width, and a fourth portion extending from the third portion substantially vertically, the first to fourth portions forming a substantially rectangular ring-like shape with a portion between the first and fourth portions being notched;
    a second magnetic core having a fifth portion longer than the first track width, a sixth portion extending from the fifth portion substantially vertically, and a seventh portion extending from the sixth portion substantially vertically, the fifth to seventh portions forming substantially a shape of letter C; and
    a gap spacer made of a nonmagnetic material and placed between the first and fifth portions,
    wherein outer circumferential surfaces of the first and fifth portions form a surface to be brought into slidable contact with a magnetic medium, and at least parts of the third and seventh portions and at least parts of the fourth and sixth portions are respectively stacked and joined to each other.

2. The element according to claim 1, wherein a surface of the first portion on the outer circumferential side of the second portion and an outer circumferential surface of the fifth portion on an open end side are substantially flush with each other.

3. The element according to claim 1, wherein an open-side end face of the first portion has a predetermined width in a gap depth direction, and an inner circumferential surface of the first portion is inclined such that a width in the gap depth direction increases toward the second portion, and
    an open-side end face of the fifth portion has a predetermined width in the gap depth direction, and an inner circumferential surface of the fifth portion is inclined such that a width in the gap depth direction increases toward the sixth portion.

4. The element according to claim 3, wherein a slant angle of the fifth portion and a slant angle of the first portion are substantially equal to each other in an area where at least the first and fifth portions are stacked on each other.

5. The element according to claim 3, wherein the second portion has a stepped portion on an inner circumferential surface at a boundary between the second and third portions, and forms a substantially C-shaped portion having the first portion as an upper side and the stepped portion of the second portion as a lower side.

6. The element according to claim 5, wherein the stepped portion of the second portion has an inclination on an upright portion of the second portion, and an inclined portion of the first portion and the stepped portion of the second portion form a trapezoidal notched portion.

7. The element according to claim 4, further comprising a winding portion mounted on the stepped portion of the second portion.

8. The element according to claim 3, wherein the inclination of the fifth portion includes a first inclined portion extending from an open end side and having a first slant angle and a second inclined portion having a slant angle smaller than the first slant angle.

9. A magnetic head comprising:
    said magnetic head element defined in claim 1; and
    a case member having a reference portion used to mount said magnetic head element,
    wherein said magnetic head element is mounted in said case member while an outer surface of the fifth portion of said magnetic head element is aligned with the reference portion of said case member.

10. A magnetic head comprising:
    said magnetic head element defined in claim 1; and
    a case member having first and second reference portions used to mount said magnetic head element,
    wherein said magnetic head element is mounted in said case member while a side surface of the fifth portion of said magnetic head element in a longitudinal direction is aligned with the first reference portion, and at least one of a surface of the first portion which extends to an outer circumferential surface of the second portion and an outer circumferential surface of the fifth portion on an open end side is aligned with the second reference portion.

11. A pressure plate mounted in a camera, comprising:
    said magnetic head element defined in claim 1; and
    a pressure plate body integrally molded with said magnetic head element being mounted at a predetermined position, wherein a mold for molding said pressure plate body has a plurality of positioning pins for positioning said magnetic head element, and the plurality of positioning pins determine a position of a side surface of the fifth portion of said magnetic head element in a longitudinal direction and a position of at least one of a surface of the first portion which extends to an outer circumferential surface of the second portion and an outer circumferential surface of the fifth portion on an open end side.

12. A pressure plate mounted in a camera, comprising:

a magnetic head incorporating said magnetic head element defined in claim 1 with said magnetic head element having an exposed portion in which at least part of a side surface of the fifth portion in a longitudinal direction and at least part of one of a surface of the first portion which extends to an outer circumferential surface of the second portion and an outer circumferential surface of the fifth portion on an open end side are exposed; and a pressure plate body having a window portion for exposing the slidable contact surface of said magnetic head element, wherein said magnetic head is mounted in said pressure plate body while an edge portion forming the window portion of said pressure plate body is brought into tight contact with the exposed portion of said magnetic head element.

13. A camera pressure plate comprising:

said magnetic head element defined in claim 1;

a case member having a positioning hole at a predetermined relative position from a side surface of the fifth portion of said magnetic head element in a longitudinal direction or at least one of a surface of the first portion which extends to an outer circumferential surface of the second portion and an outer circumferential surface of an open end of the fifth portion; and a pressure plate body in which a magnetic head formed by incorporating said magnetic head element in said case member is mounted, wherein said magnetic head is mounted in said pressure plate body while being positioned with the positioning hole.

14. The pressure plate according to claim 13, wherein said case member has first and second reference portions used to mount said magnetic head element and a plurality of positioning holes positioned with respect to the first and second reference portions, and said magnetic head element is mounted in said case member while the side surface of the fifth portion of said magnetic head element in the longitudinal direction is aligned with the first reference portion, and at least one of the surface of the first portion which extends to the outer circumferential surface of the second portion and the outer circumferential surface of the fifth portion on the open end side is aligned with the second reference portion.

15. The pressure plate according to claim 13, wherein said magnetic head is integrally formed with said case member by using a mold having a plurality of pins for positioning said magnetic head element for forming said magnetic head, the side surface of the fifth portion of said magnetic head element in the longitudinal direction and at least one of the surface of the first portion which extends to the outer circumferential surface of the second portion and the outer circumferential surface of the fifth portion on the open end side are positioned with respect to the first reference portion with the plurality of pins, and the plurality of positioning pins are formed by the plurality of pins.

16. A camera characterized by comprising said camera pressure plate defined in claim 11.

* * * * *

UNITED STATES PATENT AND TRADEMARK OFFICE
CERTIFICATE OF CORRECTION

PATENT NO. : 6,157,786
DATED : December 5, 2000
INVENTOR(S) : Minoru Kato, et al.

It is certified that error appears in the above-identified patent and that said Letters Patent is hereby corrected as shown below:

Column 3,
Line 1, "+30°" should read --±30° --.

Column 5,
Line 41, "80." should read -- 8°.--.

Column 6,
Line 7, "land" should read -- and --.

Column 8,
Line 8, "9 bin" should read -- 9b in --.

Signed and Sealed this

Twenty-first Day of August, 2001

Attest:

*Nicholas P. Godici*

NICHOLAS P. GODICI
*Attesting Officer*  *Acting Director of the United States Patent and Trademark Office*